(12) United States Patent
Pekarsky et al.

(10) Patent No.: US 11,691,097 B2
(45) Date of Patent: Jul. 4, 2023

(54) TRANSMISSION OIL FILTER ASSEMBLY

(71) Applicant: Ford Global Technologies, LLC, Dearborn, MI (US)

(72) Inventors: Lev Pekarsky, West Bloomfield, MI (US); William Rey Patterson, Houston, TX (US)

(73) Assignee: Ford Global Technologies, LLC, Dearborn, MI (US)

( * ) Notice: Subject to any disclaimer, the term of this patent is extended or adjusted under 35 U.S.C. 154(b) by 1632 days.

(21) Appl. No.: 15/813,203

(22) Filed: Nov. 15, 2017

(65) Prior Publication Data

US 2019/0143252 A1 May 16, 2019

(51) Int. Cl.
*B01D 35/30* (2006.01)
*B01D 35/027* (2006.01)
*F16H 61/00* (2006.01)
*F16H 57/04* (2010.01)
*F01M 1/10* (2006.01)

(52) U.S. Cl.
CPC ......... *B01D 35/30* (2013.01); *B01D 35/0273* (2013.01); *F01M 1/10* (2013.01); *F16H 57/0404* (2013.01); *F16H 57/0441* (2013.01); *F16H 61/0031* (2013.01); *B01D 2201/303* (2013.01); *F01M 2001/105* (2013.01)

(58) Field of Classification Search
CPC .............. B01D 35/027; B01D 35/0273; B01D 2201/303; F16H 57/0404
See application file for complete search history.

(56) References Cited

U.S. PATENT DOCUMENTS

| 7,282,140 | B2 | 10/2007 | Boast et al. | |
|---|---|---|---|---|
| 7,998,347 | B2 | 8/2011 | Pekarsky | |
| 2003/0201216 | A1* | 10/2003 | Wolford | B01D 35/147 210/455 |
| 2011/0144846 | A1* | 6/2011 | Zollner | B60W 10/30 903/917 |
| 2014/0158594 | A1* | 6/2014 | Schneider | F16H 57/0404 210/167.08 |
| 2015/0247431 | A1* | 9/2015 | Yuki | B01D 35/0273 210/435 |

FOREIGN PATENT DOCUMENTS

DE 102010029830 A1 12/2011

* cited by examiner

*Primary Examiner* — Benjamin M Kurtz
(74) *Attorney, Agent, or Firm* — Brooks Kushman P.C.

(57) ABSTRACT

A transmission filter includes two outlets. One outlet, adapted to feed an engine-driven pump, protrudes diagonally from the front of the filter. The first outlet is sealed to the inlet of the engine-driven pump by a radial seal. The second outlet is arranged in a rear extension and is sealed to the inlet of an electric pump by a compression seal. The differing types of seals and relative orientations of the outlets make the assembly less sensitive to dimension variation due to production and assembly tolerances. The relative locations of the outlets also mitigate any flow interactions between the pumps when both operate simultaneously.

11 Claims, 4 Drawing Sheets

TRANSMISSION OIL FILTER ASSEMBLY

TECHNICAL FIELD

This disclosure relates to the field of transmission systems. More particularly, the disclosure pertains to a filter assembly.

BACKGROUND

Automatic transmission fluid serves many functions in a modern automatic transmission. Pressurized fluid may be used to engage friction clutches in order to establish a power flow path with a desired speed ratio. Fluid lubricates gears and bearings. Excess heat is removed by fluid flowing over various components. When the fluid contain contaminants, it may be less effective in these functions and may cause failures such as stuck valves. Therefore, transmissions often include fluid filters.

Filters may be placed on either the inlet (low pressure) side of a transmission pump or on the outlet (high pressure) side of a transmission pump. Transmission oil filters typically contain a filtration media. The media may be pleated to increase the surface area in a limited space.

SUMMARY OF THE DISCLOSURE

A transmission includes a filter, an engine driven pump, and an electric pump. The a filter has a bottom surface defining a filter inlet, a top surface defining a rear outlet hole, and a front outlet tube projecting from a front end at an oblique angle relative to the top surface. The filter may further include a rear extension projecting from a rear end in which case the rear outlet hole is defined in the top surface over the rear extension. The engine driven pump has an inlet sealed to the front outlet tube by a radial seal. The electric pump is sealed to the top surface around the rear outlet hole by a compression seal. The transmission may also include two bolts fastening the rear extension to the electric pump and compressing the compression seal.

A filter assembly includes a main body, a rear extension, and a front outlet tube. The main body is adapted to fit into a transmission sump, contains filter media, and has a bottom surface defining an inlet. The rear extension extends from the main body and has a top surface defining a rear outlet hole. The rear extension may further define two mounting holes. The rear outlet hole may be between the two mounting holes. A compression seal may surround the rear outlet hole. The front outlet tube projects from a front of the main body at an oblique angle relative to the top surface. A radial seal may be arranged around the front outlet tube.

A method of assembling a transmission includes installing an engine-driven pump and an electric pump, sealing a first outlet of a filter to an inlet of the engine-driven pump using a radial seal, positioning a second outlet of the filter adjacent to an inlet of the electric pump, and bolting the filter to the electric pump to compress a seal between the filter and the inlet of the electric pump. Positioning the second outlet of the filter adjacent to the inlet of the electric pump may include moving the filter parallel to an axis of an inlet tube of the engine-driven pump and diagonally with respect to an inlet of the electric pump. The engine driven pump and the electric pump may be fastened directly to a transmission case.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
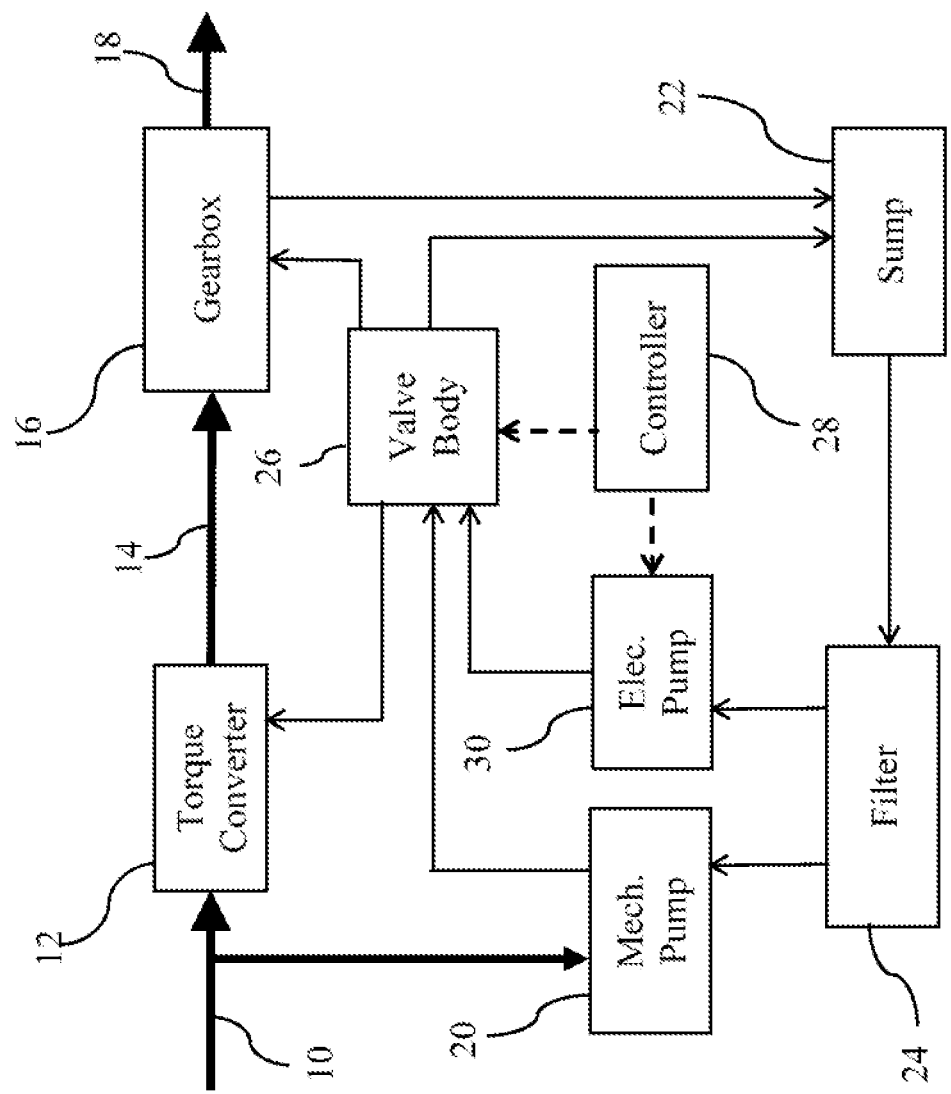
FIG. 1 is a schematic diagram of a vehicle transmission.

FIG. 1 schematically illustrates a transmission hydraulic system. Bold lines indicate mechanical power flow. Thin solid lines indicate flow of hydraulic fluid. Dashed lines indicate electrical signals. Transmission input shaft 10 is connected to the vehicle crankshaft. Power from the engine is delivered to torque converter 12 which drives turbine shaft 14. Clutches within gearbox 16 are engaged to establish a power flow path from turbine shaft 14 to output shaft 18. Different power flow paths having different speed ratios may be established by engaging different clutches. In a rear wheel drive transmission, output shaft 18 is connected to a driveshaft which transmits the power to a rear differential and then to rear wheels. In a four wheel drive vehicle, a transfer case may be installed between the output shaft and the driveshaft to divert a portion of the power to a front differential and then to front wheels. In a front wheel drive vehicle, the output shaft may transmit power to a front differential via gears or a chain.

Some engine power is diverted to drive mechanical pump 20. Mechanical pump 20 draws fluid from sump 22, through filter 24, and delivers the fluid, at increased pressure, to valve body 26. The pressure at which fluid enters the valve body may be called line pressure. Controller 28 commands a network of control valves within the valve body to deliver fluid to torque converter and gearbox components at desired pressures less than line pressure and at desired flow rates. Fluid drains from the control valves and from the gearbox back into sump 22.

In some vehicles, controller 28 may shut the engine off during idle conditions to save fuel. With the engine off, mechanical pump 20 does not provide pressurized fluid. In order to respond quickly when the driver releases the brake pedal, it may be necessary to maintain clutches in an engaged state or a ready-to-engage state. Electric pump 30 provides pressurized fluid for this purpose. Electric pump 30 may also be used in other circumstances. For example, electric pump 30 may be used to supplement the flow rate of mechanical pump 20 during periods of high fluid demand, enabling use of a smaller mechanical pump with less parasitic drag.

It is preferable to use a single filter for both pumps 20 and 30, such that all of the filter area is available when either pump is operating alone. However, use of a shared filter can introduce some issues. When the flow rate into one of the pumps is high, there may be a low pressure near the outlet servicing that pump. If the outlet servicing the other pump is located in that low-pressure area, it may be unable to draw sufficient fluid when the two pumps operate simultaneously. Also, effectively sealing a filter outlet to a pump inlet may require accurately relative positioning. To achieve this, the filter retention provisions may allow some position adjustment during assembly to accommodate piece to piece variation due to production tolerances. When a filter services multiple pumps, the relative position of the two pumps may vary due to piece to piece variation. Adjusting the position of the filter relative to one of the pumps may place the filter in an improper location relative to the other pump.

Figure 2:
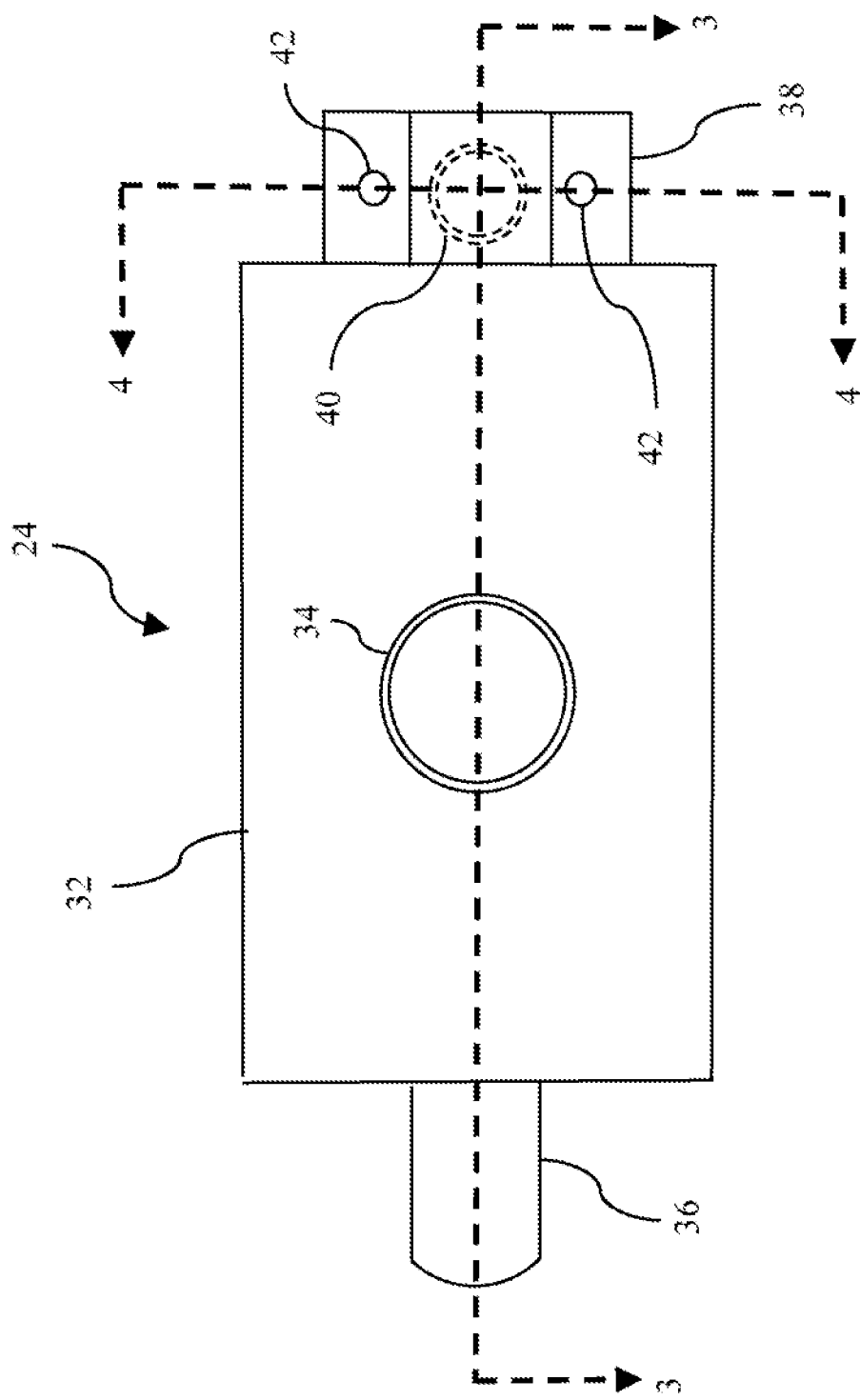
FIG. 2 is a bottom view transmission suction filter.

FIG. 2 is a bottom view a transmission suction filter suitable for servicing multiple pumps. The filter includes a filter body 32. An inlet opening 34 in the bottom of the body permits fluid to enter the body from the transmission sump 22. A front outlet tube 36 extends forward to service mechanical pump 20. As shown most clearly in FIG. 3, front outlet tube 36 extends diagonally upward. The filter includes a rear extension 38. A rear outlet 40 is formed in the top of the rear extension to service electric pump 30. Two mounting holes 42 are formed in the rear extension.

Figure 3:
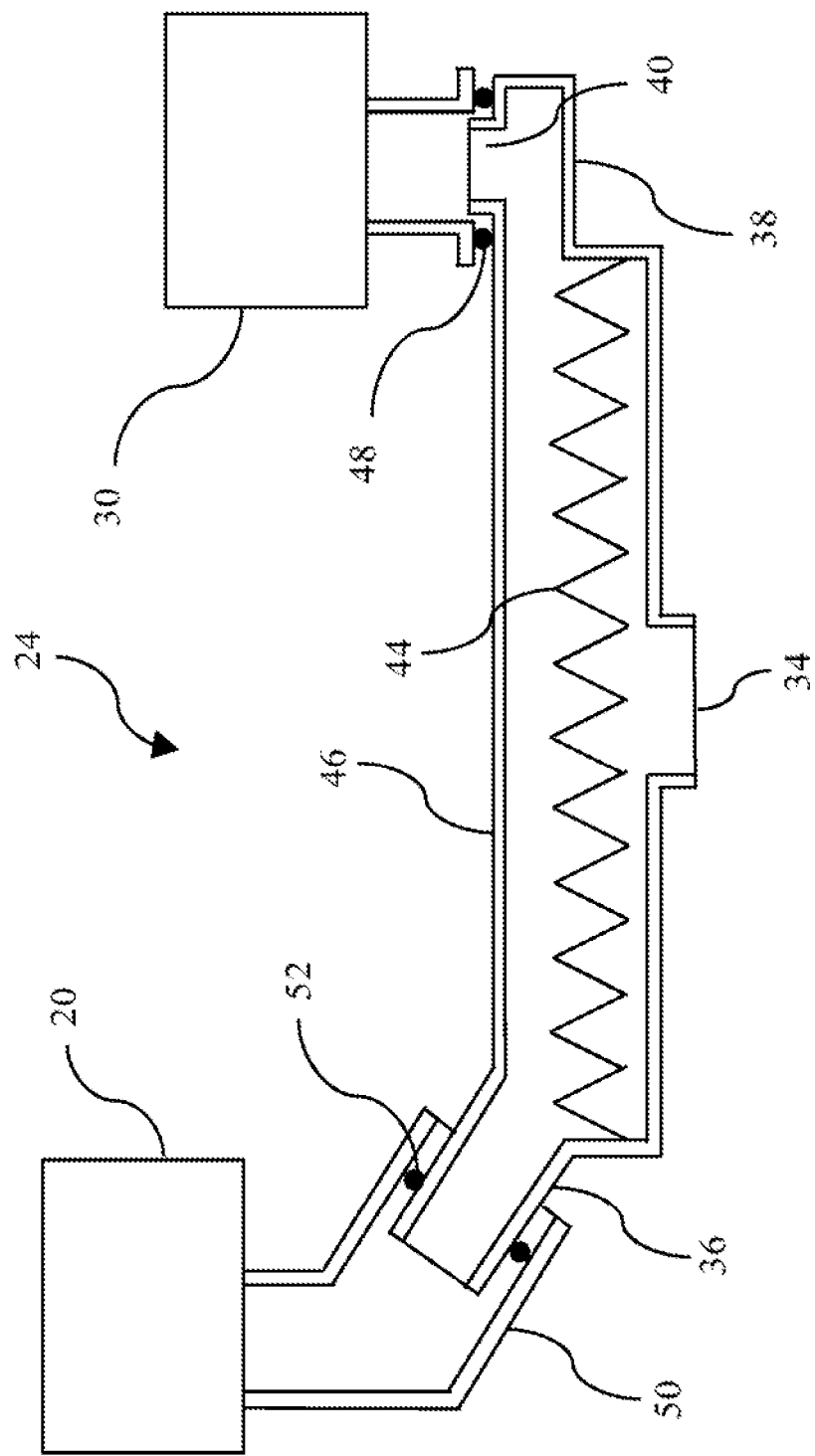
FIG. 3 is a side cross section of the filter of FIG. 2.

FIG. 3 is a cross sectional view of filter 24 and the two pumps 20 and 30. Filtration media 44 is contained within filter body 32 such that fluid entering inlet 34 on the bottom flows through the media 44 before exiting through either front outlet tube 36 or rear outlet hole 40. In the illustrated embodiment, top surface 46 extends over the main body of the filter and over the rear extension 38. In some embodiments, the top surface of the rear extension may be slightly higher or slightly lower than the top surface of the main body. A compression seal 48 surrounds rear outlet hole 40 between top surface 46 and an inlet flange of electric pump 30. An inlet tube 50 of mechanical pump 20 extends over front outlet tube 36. A radial seal 52 prevents fluid from leaking from the fluid filter back to the sump between these components.

Placing the outlets at opposite ends of the filter assures minimal pressure interaction between the pumps. In other words, when both pumps operate simultaneously, one does not create a low pressure region in the vicinity of the other pumps inlet. When only one pump operates, the full area of the filter media is available, thus minimizing parasitic pressure loss.

Figure 4:
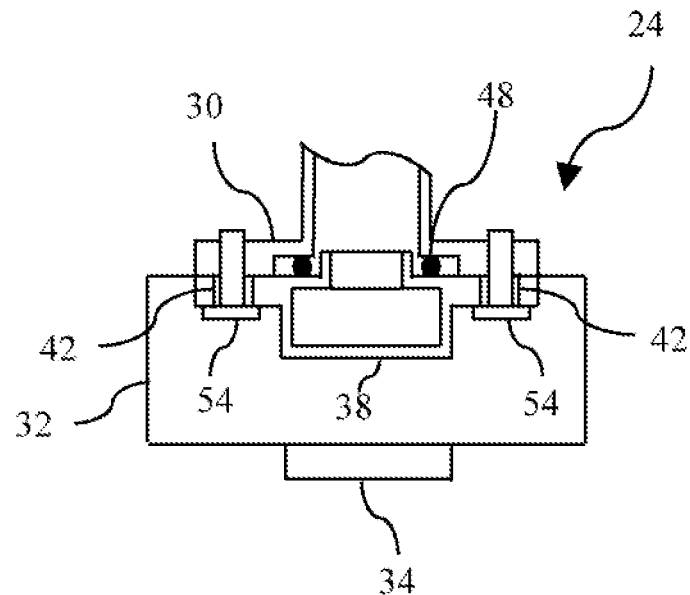
FIG. 4 is a rear cross section of the filter of FIG. 2.

FIG. 4 is a second cross sectional view of filter 24 showing a portion of electric pump 30. The inlet flange of electric pump 30 extends over the two mounting holes 42 in the rear extension. Bolts 54 extend through mounting holes 42 into threaded holes in the electric pump flange. Tightening these bolts compresses compression seal 48. Also, the bolts position the rear end of the filter vertically, horizontally, and rotationally. The front end of the filter is supported by the inlet tube of the mechanical filter.

Figure 5:
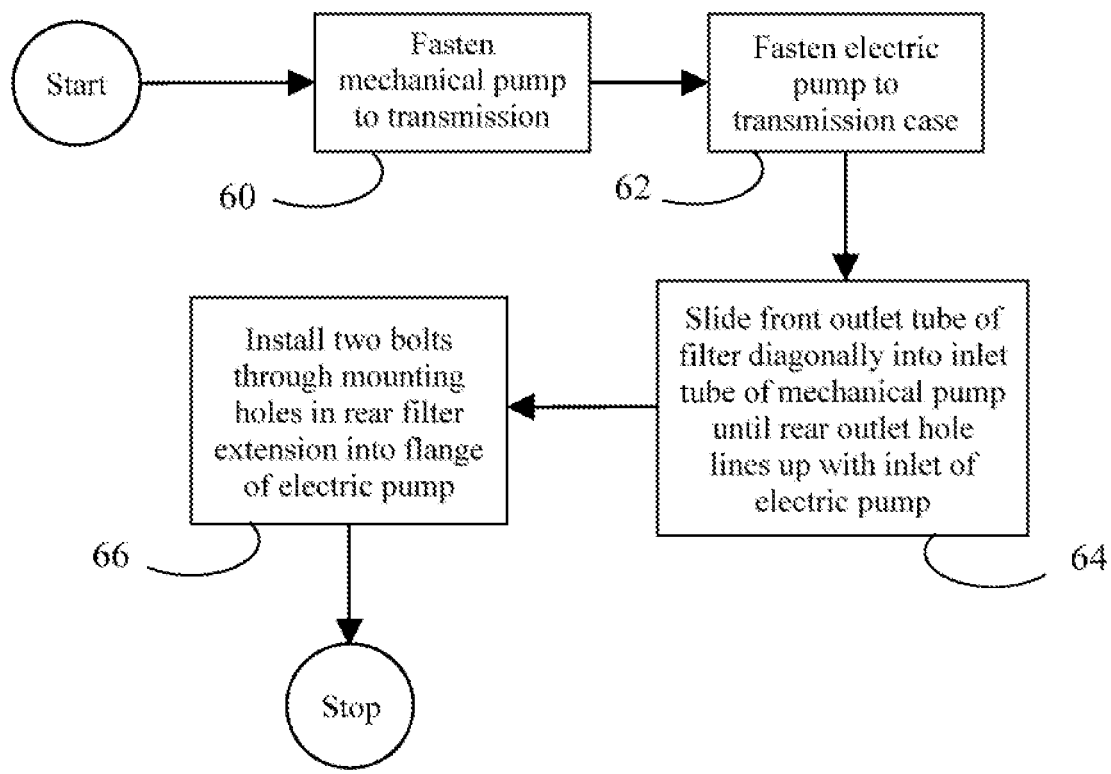
FIG. 5 is a flow chart of a process of assembling the transmission FIG. 1 using the filter of FIGS. 2-4.

FIG. 5 is a flowchart illustrating an assembly process for the transmission of FIG. 1. At 60, mechanical pump 20 is install by fastening it to the transmission case. At 62, the electric pump is install by fastening it to the transmission case. A number of noise factors may cause variation in the relative locations of the inlet ports of the two pumps. In addition to dimensional tolerances of the parts themselves, the joints may involve some variability. The pumps are typically installed by installing screws or bolts through mounting holes into pre-drilled threaded holes in the case. The mounting holes typically have some clearance around the screws which simplify the assembly process but allow some location variation. Features that would more precisely locate the pumps relative to the case and to one another add cost and increase assembly time.

At 64, the filter is positioned by sliding the front outlet tube 36 into mechanical pump inlet tube 50 until the rear outlet hole lines up with the electric pump inlet. Since the rear outlet hole may not be visible during this process, it may be desirable to use the mounting holes 42 and the threaded holes in the electric pump flange to determine alignment. If the two pumps are closer to one another than the nominal dimensions, then tube 36 slides further into tube 50. If the pump inlets are father apart than the nominal dimensions, then tube 36 and tube 50 overlap less. The effectiveness of the radial seal is not sensitive to how far outlet tube 36 slides into inlet tube 50 (within a wide range). The radial seal is also effective in the presence of slight mis-alignment between the axes of tubes 36 and 50.

At 66, two bolts are installed through mounting holes 42 into the electric pump flange. As these bolts are tightened, seal 48 is compressed. The mounting holes are preferably on opposite sides of the rear outlet hole to ensure even compression and minimum sensitivity to mis-alignment between axes of the rear outlet hole and the electric pump inlet.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
a filter having a bottom surface defining a filter inlet, a top surface defining a rear outlet hole, and a front outlet tube projecting from a front end at an oblique angle relative to the top surface;
an engine driven pump having an inlet sealed to the front outlet tube by a radial seal installed in a section of the front outlet tube that projects from the front end at the oblique angle; and
an electric pump sealed to the top surface around the rear outlet hole by a compression seal.

2. The transmission of claim 1 wherein the filter further includes a rear extension projecting from a rear end and wherein the rear outlet hole is defined in the top surface over the rear extension.

3. The transmission of claim 2 further comprising two bolts fastening the rear extension to the electric pump and compressing the compression seal.

4. The transmission of claim 3 wherein the front end of the filter is supported by the inlet of the engine driven pump via the radial seal and the front outlet tube.

5. The transmission of claim 1 wherein the radial seal is oriented at an angle relative to the compression seal.

6. A transmission comprising:
- a filter having a bottom surface defining a filter inlet, a top surface defining a rear outlet hole, and a front outlet tube projecting from a front end at an oblique angle relative to the top surface;
- an engine driven pump having an inlet sealed to the front outlet tube by a radial seal wherein the inlet of the engine driven pump is oriented at the oblique angle relative to the top surface; and
- an electric pump sealed to the top surface around the rear outlet hole by a compression seal.

7. The transmission of claim 6 wherein the radial seal is installed in a section of the front outlet tube that projects from the front end at the oblique angle.

8. The transmission of claim 6 wherein the filter further includes a rear extension projecting from a rear end and wherein the rear outlet hole is defined in the top surface over the rear extension.

9. The transmission of claim 6 further comprising two bolts fastening the rear extension to the electric pump and compressing the compression seal.

10. The transmission of claim 9 wherein the front end of the filter is supported by the inlet of the engine driven pump via the radial seal and the front outlet tube.

11. The transmission of claim 6 wherein the radial seal is oriented at an angle relative to the compression seal.

* * * * *